(12) United States Patent
Michalowski et al.

(10) Patent No.: US 11,347,068 B2
(45) Date of Patent: May 31, 2022

(54) DEVICE AND METHOD FOR LASER MATERIAL PROCESSING

(71) Applicant: Robert Bosch GmbH, Stuttgart (DE)

(72) Inventors: Andreas Michalowski, Filderstadt (DE); Ulrich Graf, Bietigheim-Bissingen (DE); Roland Gauch, Ditzingen (DE); Jens Koenig, Markgroeningen (DE); Thomas Kiedrowski, Sersheim (DE)

(73) Assignee: Robert Bosch GmbH, Stuttgart (DE)

(*) Notice: Subject to any disclaimer, the term of this patent is extended or adjusted under 35 U.S.C. 154(b) by 326 days.

(21) Appl. No.: 14/951,205

(22) Filed: Nov. 24, 2015

(65) Prior Publication Data

US 2016/0147075 A1 May 26, 2016

(30) Foreign Application Priority Data

Nov. 26, 2014 (DE) ...................... 10 2014 224 182.0

(51) Int. Cl.
*G02B 27/09* (2006.01)
*B23K 26/073* (2006.01)

(52) U.S. Cl.
CPC ........ *G02B 27/0927* (2013.01); *B23K 26/073* (2013.01); *G02B 27/0944* (2013.01)

(58) Field of Classification Search
CPC ............ G02B 27/0927; G02B 27/0944; G02B 27/09; G02B 27/0933; G02B 27/0938;
(Continued)

(56) References Cited

U.S. PATENT DOCUMENTS

| 4,410,237 A | * | 10/1983 | Veldkamp | ............ | G02B 5/1871 |
| | | | | | 342/22 |
| 5,164,565 A | * | 11/1992 | Addiego | .............. | B23K 26/032 |
| | | | | | 219/121.6 |

(Continued)

FOREIGN PATENT DOCUMENTS

| DE | 10 2010 005 774 A1 | 3/2011 |
| EP | 2275222 A1 * | 1/2011 | ......... B23K 26/0665 |

(Continued)

OTHER PUBLICATIONS

Dausinger et al., Femtonic Lasers in Mechanical Engineering—Microstructuring and Boring, LTJ, Nr. 4, Nov. 2005, pp. 40-47, German language document.

*Primary Examiner* — Geoffrey S Evans
(74) *Attorney, Agent, or Firm* — Maginot, Moore & Beck LLP (57) ABSTRACT

A device for projecting a laser beam onto a workpiece includes at least one first optical element, at least one second optical element, and at least one third optical element. The at least one first optical element is configured to project the laser beam onto the at least one second, in particular diffractive, optical element. The at least one second optical element is configured to convert an intensity profile of the laser beam. The at least one third optical element is configured to project the laser beam onto the workpiece. The device is configured such that a diameter of the laser beam on the workpiece can be varied while maintaining the intensity profile with a stationary workpiece.

14 Claims, 5 Drawing Sheets

(58) Field of Classification Search
CPC .............. G02B 27/095; G02B 27/0961; B23K 26/073; B23K 26/064; B23K 26/0648
USPC .......... 219/121.85, 121.68, 121.69; 359/379, 359/695, 365, 392, 405, 411, 412, 414, 359/416, 417, 418, 558, 744, 676, 682, 359/684, 686, 689, 694, 707, 715, 716, 359/721, 726, 733, 737, 741
See application file for complete search history.

(56) References Cited

U.S. PATENT DOCUMENTS

| | | | | |
|---|---|---|---|---|
| 5,336,216 | A * | 8/1994 | Dewey | A61F 9/008 359/379 |
| 5,667,707 | A * | 9/1997 | Klingel | B23K 26/046 219/121.67 |
| 5,684,642 | A * | 11/1997 | Zumoto | B23K 26/032 359/739 |
| 5,955,243 | A * | 9/1999 | Tanitsu | G03F 7/70058 355/50 |
| 6,392,742 | B1 * | 5/2002 | Tsuji | G03F 7/70183 250/492.2 |
| 6,433,301 | B1 * | 8/2002 | Dunsky | B23K 26/073 219/121.67 |
| 6,504,652 | B1 * | 1/2003 | Ichihashi | G02B 27/09 250/201.9 |
| 2004/0084607 | A1 * | 5/2004 | Ichihashi | B23K 26/073 250/216 |
| 2005/0006655 | A1 * | 1/2005 | Tanaka | H01L 21/268 257/80 |
| 2006/0062127 | A1 * | 3/2006 | Burghardt | G02B 27/0933 369/121 |
| 2007/0017908 | A1 * | 1/2007 | Sercel | B23K 26/066 219/121.73 |
| 2007/0284785 | A1 * | 12/2007 | Hoekstra | C03B 33/03 264/400 |
| 2011/0127697 | A1 * | 6/2011 | Milne | B23K 26/046 264/400 |
| 2011/0180519 | A1 * | 7/2011 | Kajikawa | B23K 26/40 219/121.69 |
| 2013/0044371 | A1 * | 2/2013 | Rupp | B23K 26/38 359/432 |
| 2013/0050838 | A1 * | 2/2013 | Nagano | B23K 26/0665 359/641 |
| 2014/0307312 | A1 * | 10/2014 | Rupp | B23K 26/046 359/432 |
| 2017/0275041 | A1 * | 9/2017 | Cridland | B65C 9/46 |

FOREIGN PATENT DOCUMENTS

| | | |
|---|---|---|
| JP | 2001-121282 A | 5/2001 |
| JP | 2003-112280 A | 4/2003 |
| JP | 2005-257735 A | 9/2005 |
| JP | 2008-087000 A | 4/2008 |

* cited by examiner

DEVICE AND METHOD FOR LASER MATERIAL PROCESSING

This application claims priority under 35 U.S.C. § 119 to patent application no. DE 10 2014 224 182.0, filed on Nov. 26, 2014 in Germany, the disclosure of which is incorporated herein by reference in its entirety.

BACKGROUND

Erosion with laser pulses in the µs to fs pulse duration range has been widely known for many years, see for example Dausinger, F., Schmitz, G. and Sutter, D. (2005), Femtonische Laser im Maschinenbau—Mikrostrukturieren and Bohren [Femtonic lasers in mechanical engineering—microstructuring and boring] LTJ, 2: 40-47.doi: 10.1002/latj.200790064.

In particular, it is known to erode three-dimensional structures by moving a focused laser beam, a focal plane of the laser beam typically lying close to a surface of a workpiece to be processed.

The movement of the laser focus with respect to the workpiece may in this case, for example, be carried out by a galvanoscanner in the XY directions (i.e. longitudinal and transversely with respect to the workpiece surface). Other beam deviation devices are also known, which comprise for example rotating wedge plates and/or the like. An optional displacement of the laser focus in the beam direction by means of a mobile lens arranged in the beam path is likewise known, see for example the VarioScan system from the company Scanlab AG.

Optical elements for converting the intensity profile of a laser beam are likewise already known. For example by means of diffractive and/or refractive optics, laser beams having a Gaussian intensity profile can be converted into laser beams which have a top-hat intensity profile in one or more defined planes, for example a Gauss-to-Top Hat Focus Beam Shaper from the company TOPAG Lasertechnik GmbH, see for example DE102010005774A1. Such laser beams having top-hat intensity profiles are particularly attractive for laser material processing, particularly when using laser pulses which are shorter than 50 ps, since particularly good and reproducible processing results can be achieved in this case with the essentially constant energy density, or power density.

SUMMARY

Figure 1A:
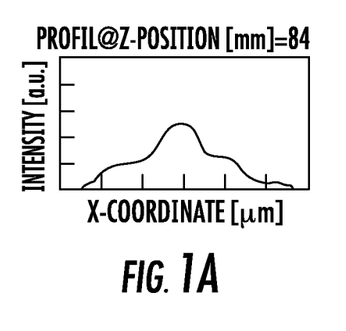
FIGS. 1A-1P explain the focusing of a laser beam having a top-hat beam profile and shows intensity profiles at various positions of the laser beam.

The disclosure is based on the observation that, in the case of laser beams having a top-hat intensity profile, the intensity profile is not top-hat-shaped along the entire laser beam, but has similarity to a top-hat distribution merely at one or more positions in the beam direction. In the beam propagation starting from these positions, the top-hat intensity profile then changes at least temporarily into other intensity profiles, according to the physical laws to which light is subject during its propagation because of its wave nature. This phenomenon is represented in FIGS. 1A-1P with the aid of a sequence which shows the intensity profiles of a focused laser beam at various positions in the beam direction in the individual diagrams 1A to 1P. The respective position in the beam direction is denoted by the respectively indicated z-position.

Figure 1B:
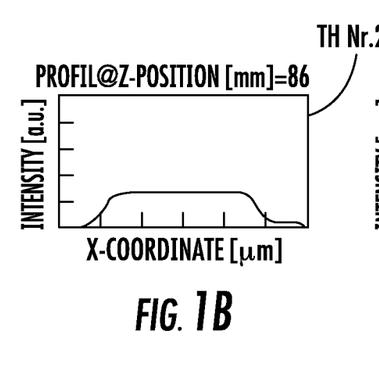
Figure 1C:
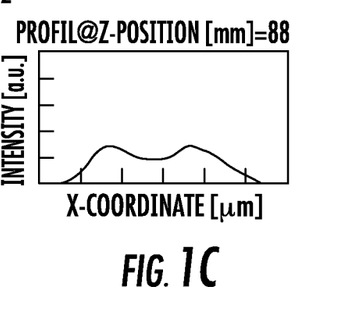
Figure 1D:
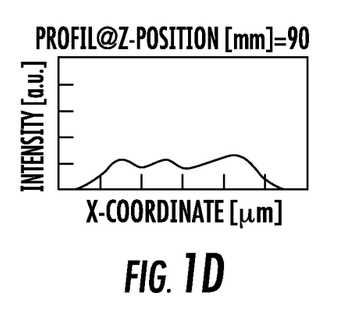
Figure 1E:
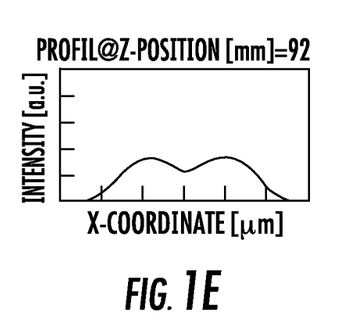
Figure 1F:
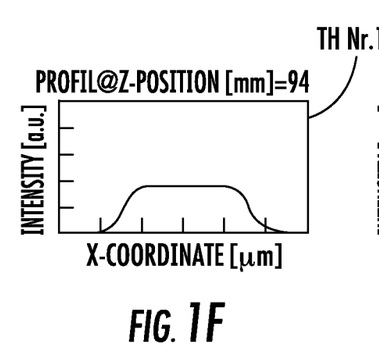
Figure 1G:
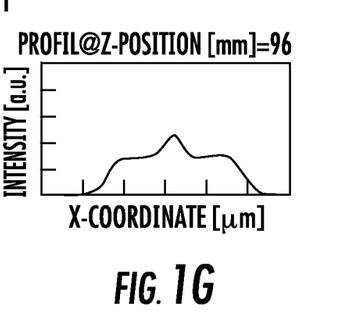
Figure 1H:
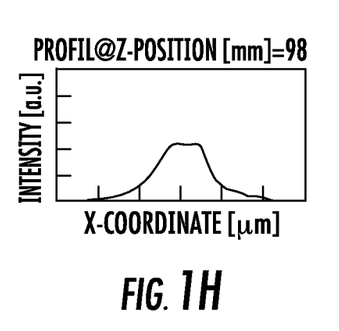
Figure 1I:
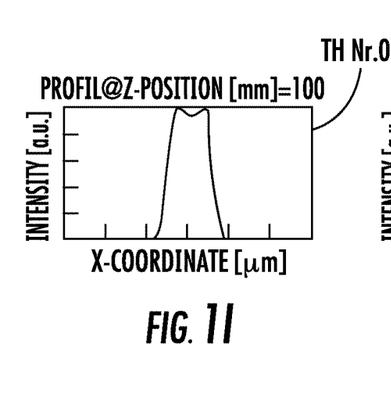
Figure 1J:
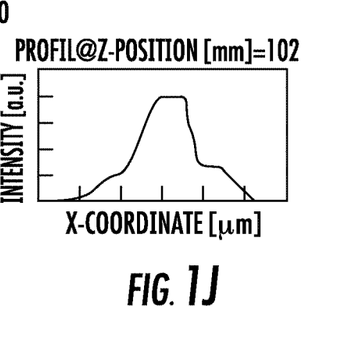
Figure 1K:
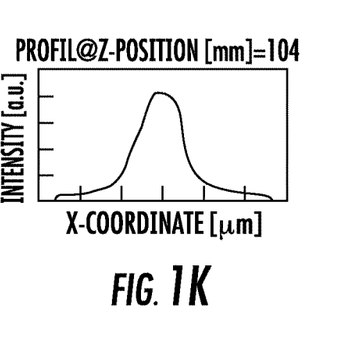
Figure 1L:
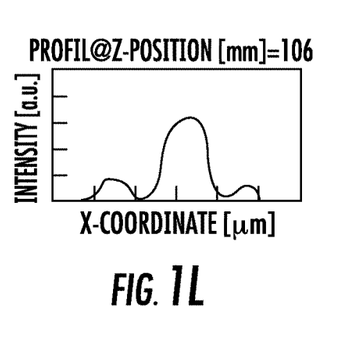
Figure 1M:
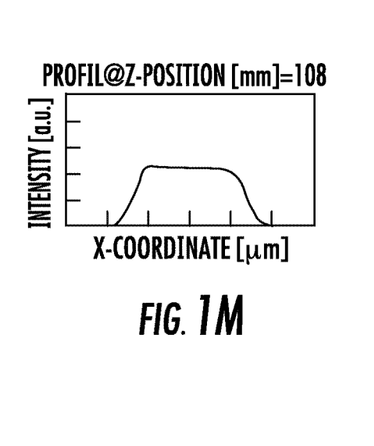
Figure 1N:
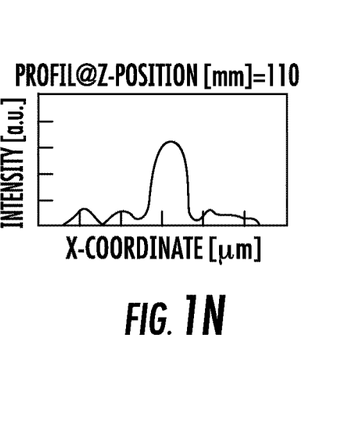
Figure 1O:
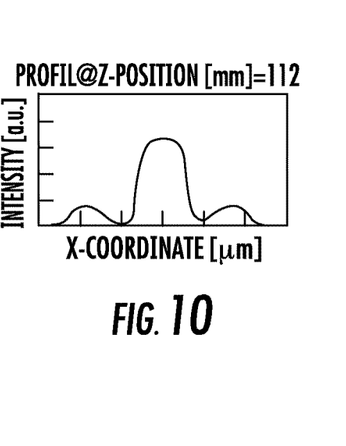
Figure 1P:
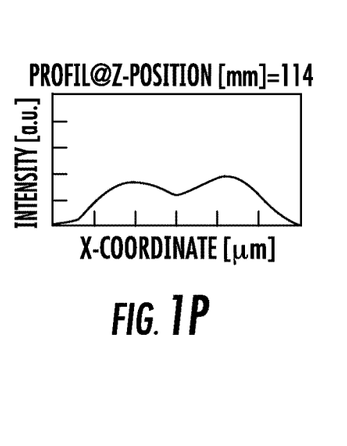

In this example, the laser beam has a top-hat intensity profile only in the focal plane, at the position z-position [mm]=100, see FIG. 1I), and at the positions z-position [mm]=86, see FIG. 1B) and z-position [mm]=94, see FIG. 1F) and z-position [mm]=108, see FIG. 1M). Between these, the laser beam has different intensity profiles, at least some of which are less advantageous particularly when using laser pulses which are shorter than 50 ps.

It is therefore a separate aspect of the present disclosure, for the processing of a workpiece with a preferably focused laser beam which has a top-hat intensity profile at one or more positions in the laser beam, to arrange the workpiece surface to be processed at this or one of these positions in the laser beam. Furthermore, provision may also be made that the workpiece surface to be processed is initially arranged at one of these positions and is subsequently arranged at another of these positions. In other words, it "jumps" between positions of the beam at which there is a top-hat intensity profile. In the example of FIGS. 1A-1P, these are for example the positions with the z coordinates z-position [mm]=86, see FIG. 1B) and z-position [mm]=100, see FIG. 1I). Since the beam diameter at these positions is different, in a refinement of the method it is possible to provide rough processing of the workpiece with a large beam radius (for example at z-position [mm]=86, see FIG. 1B)) and, for example subsequent, fine processing with a small beam radius (for example at z-position [mm]=100, see FIG. 1I)).

The "jumping" between different positions of the beam, at which there is a top-hat intensity profile, is of course in principle also possible by displacement of the workpiece in the laser beam.

Because of the relatively large masses moved, however, displacement of the workpiece in the laser beam is comparatively elaborate and slow. It is therefore advantageous to make the workpiece stationary during the processing and to carry out the "jumping" between different positions of the beam, at which there is a top-hat intensity profile, by displacing these positions by manipulating the laser beam with optical elements in the beam path. Since the masses moved are relatively small in this case, this is possible with much less outlay, or much more rapidly.

The method according to the disclosure accordingly provides projection of the laser beam onto the workpiece, with the following steps:

The laser beam is transmitted by at least one focusing or defocusing first optical element onto at least one beam-shaping diffractive or refractive second optical element.

The wavefront of the laser beam is modulated by the at least one second optical element in such a way that, after focusing of the beam by the third element, there is a top-hat beam profile in a plurality of planes in the convergent beam.

The laser beam is projected by at least one third optical element onto the workpiece.

The diameter of the laser beam on the workpiece is varied between discrete values while maintaining the top-hat intensity profile with a stationary workpiece.

As an alternative, the beam-shaping element may also be positioned between the beam source and the focusing or defocusing first optical element. In this case, the phase-modulating beam shaping element is configured precisely for the beam diameter which exists at the position of the beam shaping element after propagation of the radiation from the laser.

The disclosure furthermore relates to devices with which the method according to the disclosure can be carried out.

Although the term laser beam is to be understood here in principle without further restriction in the sense of a light beam, it may in particular be a pulsed laser beam, for example with pulses which are shorter than 50 ps. It may, for example, be a laser beam which is at least substantially diffraction-limited (for example $M^2<1.2$). The laser beam may, for example, be generated by a mode-coupled solid-state laser and may, for example, have an optical wavelength in the region of 1 μm or its frequency-doubled or frequency-tripled wavelength.

In principle, projection is intended here to mean merely the spatial propagation of the laser beam along the beam axis. Projection of a particular beam profile, for example a top-hat profile, at a particular position is, however, intended to mean that the laser beam assumes this profile at this position.

The optical elements provided according to the disclosure may respectively, for example, be lenses or lens systems. Other optical elements may also be envisaged in principle.

A particular optical element is a diffractive optical element. This may for example be configured as a light phase modulator, and may for example modulate the almost plane wavefront of a collimated laser beam, which has an (almost) Gaussian intensity profile, in such a way that after focusing in defined planes the laser beam has a different intensity profile around the beam waist, for example a top-hat intensity profile. Other optical elements for converting the intensity profile of a laser beam in defined planes around the beam waist, for example corresponding refractive optics, may of course be used in addition or as an alternative.

The terms maintaining or converting an intensity profile of a laser beam are related not to the parameters of beam diameter and intensity, but merely to the basic configuration of the intensity profile, for example when the intensity is represented as a function of a lateral coordinate, as in FIGS. 1A-1P.

The conversion of a top-hat profile into a top-hat profile is therefore to be mentioned by way of example for the maintaining of a beam profile, even if the beam diameter and/or the beam intensity change and different beam profiles occur in all planes between these top-hat distributions. A top-hat profile is intended, in particular, to mean a top-hat profile in the sense of EN ISO 13694:2000; intensity profiles having a high but finite edge steepness and a remaining but minor residual waviness may still be referred to here as top-hat profiles, as is to be found in the technical field.

The conversion of a Gaussian profile into a top-hat profile in defined planes around the beam waist is to be mentioned by way of example for the conversion of a beam profile.

Preferably, an energy density and/or power density of the laser beam on the workpiece is maintained during the processing, i.e. it varies at most slightly, for example by not more than 10%. During processing of the workpiece with laser radiation having different beam diameters, the laser power or laser/pulse energy is thus adapted accordingly. Corresponding means for generating and/or amplifying and/or attenuating the laser beam may to this extent be used.

A displacement of the positions, at which there is a particular intensity profile in the beam path, in the beam direction may be achieved by displacing one or more optical components in the beam path, as already explained above. One complication to be seen in this is, however, that the effectiveness of the second, in particular diffractive, optical element for conversion of the intensity profile of the laser beam may be impaired by such displacements of one or more optical components in the beam path.

A conversion, provided by way of example, of a laser beam having a Gaussian intensity profile into a laser beam having a top-hat intensity profile is then, for example, no longer carried out as desired.

One very important quantity is in this case the illumination of the second, in particular diffractively or refractively phase-modulating, optical element, i.e. the beam diameter of the laser beam at the position of the second, in particular diffractively or refractively phase-modulating, optical element. It has furthermore been found that the divergence of the laser beam at the position of the second, in particular diffractively or refractively phase-modulating, optical element has a negligible effect on whether an intended conversion takes place as desired. These parameters, in particular, are therefore available for displacing the position in the beam, at which particular beam profiles are produced, in the beam direction.

Refinements of the disclosure therefore relate to devices and methods in which a diameter of the laser beam on the at least one second optical element remains fixed and the divergence of the laser beam in the region of the at least one second optical element changes so that the diameter of the laser beam on the workpiece can be varied while maintaining the top-hat intensity profile.

In one refinement, this may be achieved on the one hand by moving the first optical element and the second, in particular diffractive, optical element through an equal distance in the same direction along the laser beam. Synchronized drives or a common carriage may, for example, be used.

One alternative is to configure the first optical element as a telescope, which influences the divergence and the beam diameter at its position in such a way that only the divergence of the laser beam changes at the position of the second optical element, but the diameter of the laser beam remains fixed. The second optical element may remain stationary in this case.

DETAILED DESCRIPTION

Figure 2A:
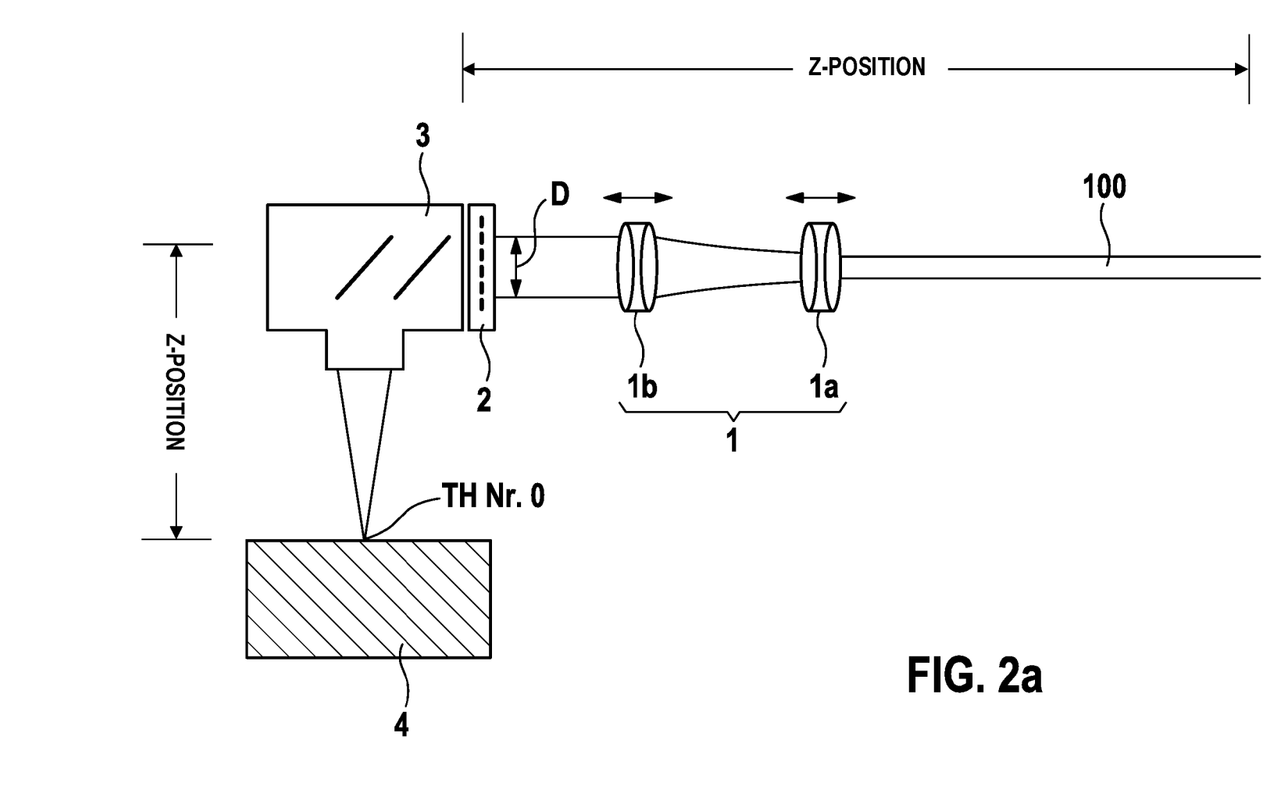
FIGS. 2A, 2B, and 3 show exemplary embodiments of the disclosure.

FIG. 2A shows a first exemplary embodiment of the present disclosure. An e.g. green collimated pulsed laser beam 100 having a Gaussian beam profile is generated by a laser apparatus (not shown) and shone onto a first optical element 1. The first optical element 1 consists of two lens pairs 1a, 1b, which can respectively be displaced independently of one another in the beam direction. In the positions of the two lens pairs 1a, 1b as indicated, a widened, again collimated laser beam 100 having a Gaussian beam profile results, which is projected with the diameter D onto the second optical element 2. The second optical element 2 in this case induces conversion of the incident laser beam into a laser beam having a top-hat profile and is arranged stationary. It is a diffractive (DOE) or refractive optical element configured as a wavefront modulator.

Arranged downstream in the beam direction, there is a third optical element 3, which is configured as a galvanometer scanner and to this extent comprises redirecting and deviating units and an objective for focusing the incident laser beam. In FIG. 2A, the focusing is carried out in such a way that the focal plane comes to lie on the workpiece surface 4 and has a first top-hat intensity profile (TH No. 0) there, corresponding to the z coordinate z=100 in FIG. 1I).

Figure 2B:
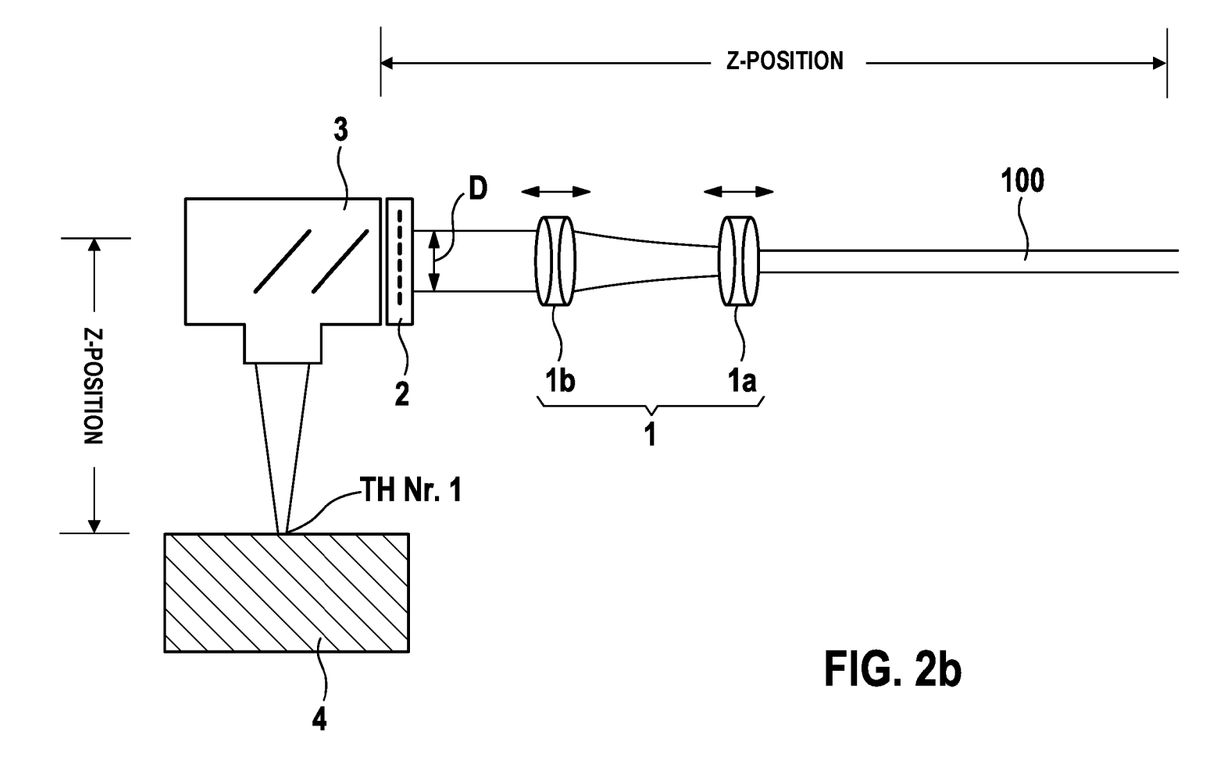

FIG. 2B shows the arrangement of FIG. 2A after the two lens pairs 1a, 1b have in general been displaced relative to one another. As a result of these displacements, the laser beam 100 again strikes the second optical element 2 while having the diameter D, but this time as a divergent beam. The focal plane of the laser beam 100 is therefore displaced into the workpiece, and a beam position at which there is likewise a top-hat profile but with a greater beam diameter than before, corresponding to the z coordinate z-position [mm]=94, see FIG. 1F) (TH No. 1), comes to lie on the workpiece surface 4.

It is possible to amplify the laser beam so much that the same power density or energy density as before is achieved on the workpiece (FIG. 2A or 1I), so that optimal processing can be carried out on the workpiece surface 4 as before.

Figure 3:
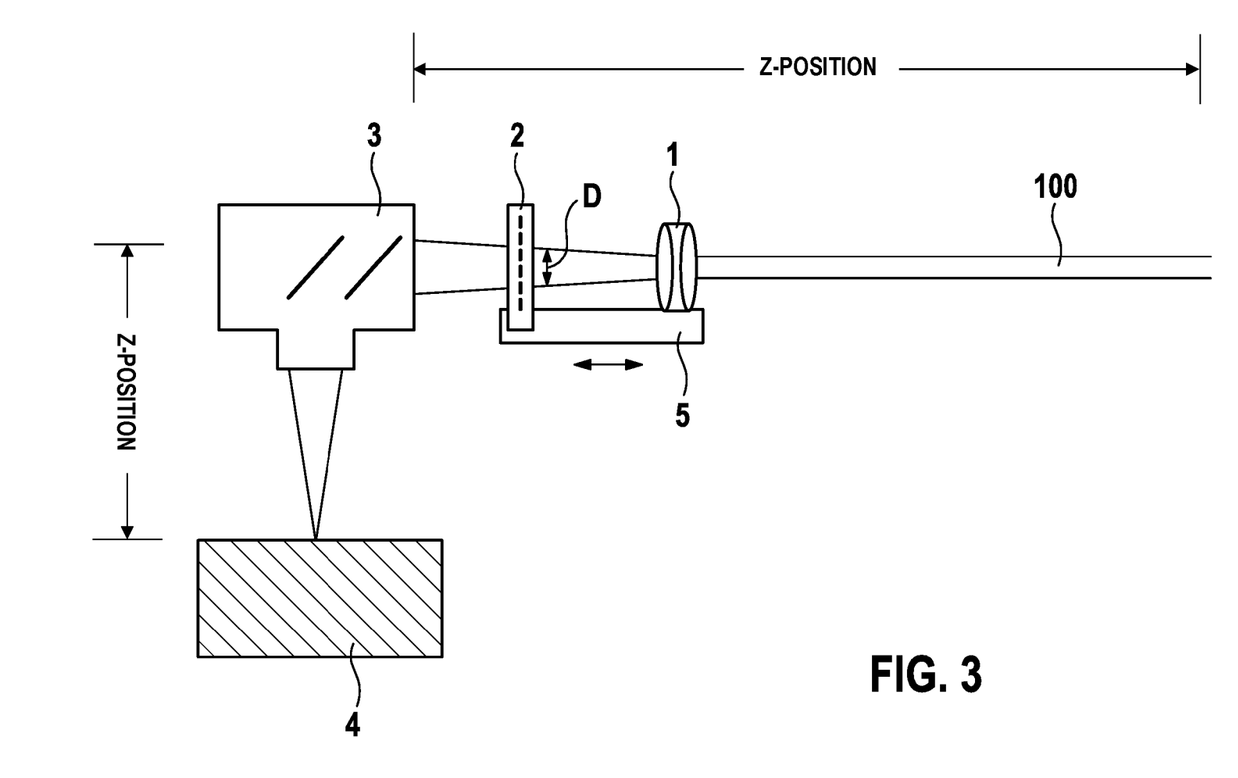

FIG. 3 shows another exemplary embodiment. This differs from the first exemplary embodiment in that the first optical element 1 can be displaced together with the second optical element 2 in the beam path. To this end, the first optical element 1 is arranged together with the second optical element 2 on an e.g. motorized carriage 5. The effect again achieved by the common movement in the collimated beam is that the beam diameter D is always kept constant on the second optical element. At the same time, the focal plane can be displaced relative to the workpiece surface. In this way, as in the first exemplary embodiment, different beam positions and therefore different top-hat intensity profiles with different beam diameters can be projected onto the workpiece surface.

As an alternative to mechanical coupling by means of a common carriage 5, the first optical element 1 and the second optical element 2 may of course also have separate drives which are electronically synchronized with one another.

What is claimed is:

1. A device for projecting a laser beam onto a stationary workpiece, comprising:
   at least one second lens configured to modulate a wavefront of the laser beam;
   at least one first lens configured to modify a beam width of the laser beam to generate a first laser beam diameter on the at least one second lens; and
   at least one third lens configured to focus the laser beam with the modulated wavefront onto the stationary workpiece,
   wherein
   at least one of the at least one second lens and the at least one first lens is movable to establish a first configuration of the at least one second lens and the at least one first lens in the device, a second configuration of the at least one second lens and the at least one first lens in the device, and a third configuration of the at least one second lens and the at least one first lens in the device,
   the first configuration is a first predefined configuration based upon a desired intensity profile,
   the third configuration is a second predefined configuration based upon the desired intensity profile,
   the device is configured to move the at least one of the at least one second lens and the at least one first lens directly from the first configuration to the third configuration through the second configuration,
   the first configuration results in a first focused laser beam on the stationary workpiece which exhibits the desired intensity profile on the stationary workpiece with the laser beam impinging the at least one second lens with the first beam diameter and with the at least one third lens in a fourth configuration,
   the second configuration results in a second focused laser beam on the stationary workpiece which does not exhibit the desired intensity profile on the stationary workpiece with the laser beam impinging the at least one second lens with the first beam diameter and with the at least one third lens in the fourth configuration, and
   the third configuration results in a third focused laser beam on the stationary workpiece which exhibits the desired intensity profile on the stationary workpiece with the laser beam impinging the at least one second lens with the first beam diameter and with the at least one third lens in the fourth configuration,
   the first focused laser beam has a first focused laser beam diameter on the stationary workpiece,
   the third focused laser beam has a second focused laser beam diameter on the stationary workpiece, and
   the first focused laser beam diameter is different from the second focused laser beam diameter.

2. The device according to claim 1, wherein the second lens is a diffractive lens.

3. The device according to claim 1, wherein the at least one first lens and the at least one second lens are configured to be displaced together from the first configuration to the third configuration.

4. The device according to claim 1, wherein the at least one first lens is configured to be displaced from the first configuration to the third configuration such that a divergence of the laser beam in a region of the at least one second lens changes between the first configuration and the third configuration.

5. The device according to claim 1, wherein:
   the desired intensity profile is a top-hat intensity profile.

6. The device of claim 5, further comprising:
   a Gaussian laser beam generator.

7. A method for projecting a laser beam onto a stationary workpiece using a laser system including at least one first lens which modifies a beam width of the laser beam, at least one second lens which modulates a wavefront of the laser beam with the modified beam width, and at least one third lens which focuses the laser beam with the modulated wavefront, the method comprising:
   identifying a first plurality of locations along a laser beam path, wherein
      positioning the at least one first lens at any one of the identified first plurality of locations results in a focused laser beam on the stationary workpiece which exhibits an intensity profile of a first type on the stationary workpiece with the laser beam impinging the
   at least one second lens with a first beam diameter and with the at least one third lens in a first configuration,
      positioning the at least one first lens at any one of a second plurality of locations results in a focused laser beam on the stationary workpiece which does not exhibit the intensity profile of the first type on the stationary workpiece with the laser beam impinging the at least one second lens with the first beam diameter and with the at least one third lens in the first configuration, and
      at least one of the second plurality of locations is located between each pair of the identified first plurality of locations along the laser beam path;
   positioning the at least one first lens at a first of the identified first plurality of positions;
   projecting the laser beam, using the at least one first lens, onto the at least one second lens with the at least one first lens at the first of the identified first plurality of positions thereby generating, with the at least one third lens in the first configuration, a first focused laser beam on the stationary workpiece which exhibits an intensity profile of the first type with a first diameter on the stationary workpiece, the intensity profile having a first beam width;

positioning the at least one first lens at a second of the identified first plurality of positions; and projecting the laser beam, using the at least one first lens, onto the at least one second lens with the at least one first lens at the second of the identified first plurality of positions thereby generating, with the at least one third lens in the first configuration, a second focused laser beam on the stationary workpiece which exhibits an intensity profile of the first type on the stationary workpiece, the intensity profile having a second beam width, wherein the first beam width is different from the second beam width.

8. The method according to claim 7, further comprising: displacing together the at least one first lens and the at least one second lens between the first of the identified first plurality of positions and the second of the identified first plurality of positions.

9. The method according to claim 7, further comprising: displacing the at least one first lens between the first of the identified first plurality of positions and the second of the identified first plurality of positions in such a way that a divergence of the laser beam in a region of the at least one second lens changes.

10. The method according to claim 7, wherein: the intensity profile of the first type is a top-hat intensity profile.

11. The method of claim 10, further comprising: generating the laser beam as a Gaussian laser beam.

12. The method according to claim 7, wherein the second lens is a diffractive lens.

13. The method of claim 7, wherein identifying the first plurality of locations along the laser beam path comprises:
identifying the first plurality of locations along the laser beam path based upon a desired intensity profile; and
the desired intensity profile is an intensity profile of the first type.

14. The method of claim 7, wherein positioning the at least one first lens at the second of the identified first plurality of positions comprises:
moving directly from the first of the identified plurality of positions to the second of the identified plurality of positions through the at least one of the second plurality of locations located between the first of the identified plurality of positions and the second of the identified plurality.

* * * * *